US008499095B1

(12) United States Patent
Sullenberger et al.

(10) Patent No.: US 8,499,095 B1
(45) Date of Patent: Jul. 30, 2013

(54) METHODS AND APPARATUS FOR PROVIDING SHORTCUT SWITCHING FOR A VIRTUAL PRIVATE NETWORK

(75) Inventors: Michael L. Sullenberger, San Jose, CA (US); Manikchand R. Bafna, Bangalore (IN); Frederic R. P. Detienne, Harze (BE)

(73) Assignee: Cisco Technology, Inc., San Jose, CA (US)

( * ) Notice: Subject to any disclaimer, the term of this patent is extended or adjusted under 35 U.S.C. 154(b) by 1374 days.

(21) Appl. No.: 11/440,551

(22) Filed: May 25, 2006

(51) Int. Cl.
*G06F 15/173* (2006.01)
*G06F 15/16* (2006.01)
*H04L 12/28* (2006.01)
*H04B 7/212* (2006.01)

(52) U.S. Cl.
USPC ............ 709/238; 709/232; 370/254; 370/321

(58) Field of Classification Search
USPC .................. 709/238, 239, 351; 370/254, 401
See application file for complete search history.

(56) References Cited

U.S. PATENT DOCUMENTS

| | | | | |
|---|---|---|---|---|
| 5,473,599 A * | 12/1995 | Li et al. | ......................... | 370/219 |
| 6,304,912 B1 * | 10/2001 | Oguchi et al. | ................ | 709/238 |
| 6,839,332 B1 * | 1/2005 | Agarwal et al. | ............... | 370/321 |
| 7,139,834 B1 * | 11/2006 | Albanese et al. | ............. | 709/238 |
| 7,468,956 B1 * | 12/2008 | Leelanivas et al. | ........... | 370/255 |
| 7,590,074 B1 * | 9/2009 | Dondeti et al. | ............... | 370/254 |
| 2002/0105915 A1 * | 8/2002 | Hamada | ........................ | 370/252 |
| 2002/0147844 A1 * | 10/2002 | Denecheau et al. | ......... | 709/245 |
| 2003/0206528 A1 * | 11/2003 | Lingafelt et al. | .............. | 370/238 |
| 2003/0212763 A1 * | 11/2003 | Kashyap | ....................... | 709/219 |
| 2004/0174887 A1 * | 9/2004 | Lee | ........................... | 370/395.53 |
| 2004/0255028 A1 * | 12/2004 | Chu et al. | ....................... | 709/227 |
| 2005/0198351 A1 * | 9/2005 | Nog et al. | ...................... | 709/232 |
| 2006/0026288 A1 * | 2/2006 | Acharya et al. | ............... | 709/227 |
| 2007/0115990 A1 * | 5/2007 | Asati et al. | ..................... | 370/392 |
| 2007/0147398 A1 * | 6/2007 | Upp et al. | ..................... | 370/401 |
| 2007/0274232 A1 * | 11/2007 | Axelsson et al. | ............. | 370/254 |

* cited by examiner

*Primary Examiner* — Ian N Moore
*Assistant Examiner* — Kiet Tang
(74) *Attorney, Agent, or Firm* — Hickman Palermo Truong Becker Bingham Wong LLP (57) ABSTRACT

A system receives a request at a hub. The request is received from a first spoke regarding a packet to be transmitted from the first spoke to a second spoke. The system identifies, at the time of the request, a preferred route from the first spoke to the second spoke. The system sends a redirect message to the first spoke, the redirect message directing the packet along the preferred route. The system transmits, from a first spoke to a hub, a first request associated with a packet. In response, the system receives, at the first spoke, a redirect message from the hub. The redirect message identifies a preferred route by which the first spoke transmits the packet to a second spoke. The system creates, at the first spoke, a second request containing a destination address of the second spoke, and transmits the second request along the preferred route.

19 Claims, 6 Drawing Sheets

203 RECEIVE A PACKET AT A HUB, THE PACKET RECEIVED FROM A FIRST SPOKE TO BE TRANSMITTED FROM THE FIRST SPOKE TO A SECOND SPOKE

204 DIRECT THE FIRST SPOKE TO TRANSMIT, TO THE HUB, INFORMATION RELATED TO AT LEAST ONE NETWORK ASSOCIATED WITH THE FIRST SPOKE

205 RECEIVE, FROM THE FIRST SPOKE, INFORMATION ASSOCIATED WITH A FIRST NETWORK CONNECTED WITH THE FIRST SPOKE

206 DIRECT THE SECOND SPOKE TO TRANSMIT, TO THE HUB, INFORMATION RELATED TO AT LEAST ONE NETWORK ASSOCIATED WITH THE SECOND SPOKE

207 RECEIVING, FROM THE SECOND SPOKE, INFORMATION ASSOCIATED WITH A SECOND NETWORK CONNECTED WITH THE SECOND SPOKE

208 MAINTAIN THE INFORMATION ASSOCIATED WITH THE FIRST NETWORK, THE SECOND NETWORK, THE FIRST SPOKE AND THE SECOND SPOKE

209 DIRECT THE FIRST SPOKE AND THE SECOND SPOKE TO TRANSMIT THEIR RESPECTIVE REQUESTS TO THE HUB

```
222 RECEIVE A REPLY FROM THE SECOND SPOKE, THE REPLY ASSOCIATED
WITH THE PACKET ASSOCIATED WITH THE SECOND REQUEST
TRANSMITTED FROM THE FIRST SPOKE TO THE SECOND SPOKE

223 RECEIVE THE REPLY INDICATING THAT THE SECOND SPOKE
    HAS IDENTIFIED ITSELF AS THE BEST SPOKE FROM A PLURALITY
    OF SPOKES, THE PLURALITY OF SPOKES COMPRISING AT LEAST
    ONE SPOKE IDENTIFIED AS CAPABLE OF CONNECTING WITH
    THE FIRST SPOKE

224 RECEIVE THE REPLY INDICATING THAT THE SECOND SPOKE
    IS IN COMMUNICATION WITH THE DESTINATION ADDRESS
    CONTAINED WITHIN THE SECOND REQUEST ASSOCIATED WITH
    THE PACKET
```

*FIG. 6*

METHODS AND APPARATUS FOR PROVIDING SHORTCUT SWITCHING FOR A VIRTUAL PRIVATE NETWORK

BACKGROUND

Virtual Private Networks (i.e., VPNs) provide a secured means for transmitting and receiving data between network nodes even though many users share a corresponding physical network supporting propagation of the data. Privacy is maintained through the use of a tunneling protocol, such as generic routing encapsulation (GRE). The data transmitted between such network nodes may or may not be encrypted to protect against eavesdropping and tampering by unauthorized parties. Because the physical network is shared, costs of using resources are generally reduced for each of many users.

A type of VPN is known as a Dynamic Multipoint VPN (DMVPN). DMVPN allows users to better scale large and small Internet Protocol Security (IPSec) VPNs by combining Generic Routing Encapsulation (GRE) tunnels, IPSec encryption, and Next Hop Resolution Protocol (NHRP) to provide users with easy configuration.

Internet Protocol Security (IPSec) VPNs are built as a collection of point-to-point links. The most efficient way to manage larger and larger collections of these point-to-point links is to arrange them into hub-and-spoke networks. All traffic from behind (i.e., the traffic from networks that must travel through the spoke to get to the hub) one spoke to behind another spoke will need to traverse first to the hub and then back out to the other spoke.

Routers define nodes in a network, and data travels between the nodes in a series of so-called "hops" over the network. Since each router is typically connected to multiple other routers, there may be multiple potential paths between given computers. Typically, the routing information is employed in a routing table in each router, which is used to determine a path to a destination computer or network. The router makes a routing decision, using the routing table, to identify the next "hop," or next router, to send the data to in order for it to ultimately reach the destination computer.

In a DMVPN environment, each spoke has a "permanent" i.e. always-on IPSec tunnel to a hub, but not to the other spokes within the network. Each spoke registers as clients of the NHRP server. The hub maintains an NHRP database of the publicly routable address(es) of the each spoke. Each spoke registers its binding of "publicly routable" address and (private, say) tunnel address when it boots and becomes capable of querying its NHRP database for the publicly routable addresses of the destination (remote) spokes in order to build direct tunnels to the destination spokes, when needed.

When a spoke needs to send a packet to a destination subnet on another (remote) spoke, it queries the NHRP server for publicly routable address of the destination (remote) spoke. After the originating spoke learns the peer address of the remote spoke, it can initiate a dynamic IPSec tunnel to the remote spoke. The spoke-to-spoke tunnels are established on-demand whenever there is traffic between the spokes. Thereafter, packets are able to bypass the hub and use the spoke-to-spoke tunnel.

SUMMARY

Conventional technologies for spoke-to-spoke traffic within a VPN suffer from a variety of deficiencies. In particular, conventional technologies for spoke-to-spoke traffic within a VPN are limited in that the hub router must know the IP addresses of all the spoke routers in the network and transmit this information to the spokes. The spokes, in turn, must have individual entries for the networks behind all the other spokes. In a large network, with, for example, more than one thousand spokes, this can overburden weak spoke routers, and may overburden the routing protocol in distributing these routes to all spokes. Additionally, the information maintained on the spokes may cause smaller subnets to be overshadowed by larger subnets that overlap the smaller subnets, even when the smaller subnets provide more efficient spoke-to-spoke routes.

Embodiments disclosed herein significantly overcome such deficiencies and provide a system that includes a packet routing process that determines the best spoke to spoke tunnel path. A first spoke, transmitting a packet to a second spoke, sends a packet to a hub (the hub associated with the first spoke). The hub determines the best path for the packet to travel from the first spoke to the second spoke. The hub sends a redirect message to the first spoke, directing the packet toward the second spoke. The packet is transmitted, through a series of hops, to the second spoke. The second spoke creates a tunnel with the first spoke and sends a reply (for the received packet) through the created tunnel.

Embodiments disclosed herein provide a system that includes a packet routing process. The packet routing process receives (at the hub) a packet to be transmitted from a first spoke to a second spoke. The packet routing process identifies (at the time of receipt of the packet) a preferred route from the first spoke to the second spoke for the packet, and sends a redirect message to the first spoke, that directs the packet along the preferred route. The packet routing process receives (at the first spoke) the redirect message from the hub. The packet routing process creates, at the first spoke, a second request containing a destination address of the second spoke (that is intended to receive the packet). The packet routing process transmits the second request throughout a network, along the preferred route. The packet routing process receives (at the first spoke) notification from the second spoke that the second spoke is initiating a connection between the second spoke and the first spoke, and then receives a reply from the second spoke. The reply is associated with the packet transmitted from the first spoke to the second spoke.

During an example operation of one embodiment, suppose a first network attached to a first spoke, is transmitting a packet to a second network attached to a second spoke. The first spoke transmits the packet to the hub attached to the first spoke. The hub identifies the preferred route between the first network and the second network, and transmits a redirect message back to the first spoke. The first spoke transmits the packet, along the preferred route, towards the second network. Through a series of hops, the second spoke receives the packet, and the second spoke identifies itself as the best spoke to transmit the packet to the second network. The second spoke creates a tunnel with the first spoke and transmits the reply back to the first spoke.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments that are disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein as embodiments disclosed herein.

It is to be understood that the system disclosed herein may be embodied strictly as a software program, as software and hardware, or as hardware alone. The features, as explained herein, may be employed in data communications devices and other computerized devices and software systems for such devices such as those manufactured by Cisco Systems, Inc. of San Jose, Calif.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

Embodiments disclosed herein provide a system that includes a packet routing process that determines the best spoke-to-spoke tunnel path. A first spoke, transmitting a packet to a second spoke, sends a request to a hub (the hub associated with the spoke). The hub determines the best path for the packet to travel from the first spoke to the second spoke. The hub sends a redirect message to the first spoke, directing the packet toward the second spoke. The packet is transmitted, through a series of hops, to the second spoke. The second spoke creates a tunnel with the first spoke and sends a reply (for the received packet) through the created tunnel.

Embodiments disclosed herein provide a system that includes a packet routing process. The packet routing process receives (at the hub) a request regarding a packet to be transmitted from a first spoke to a second spoke. The packet routing process identifies (at the time of the request) a preferred route from the first spoke to the second spoke for the packet, and sends a redirect message to the first spoke, that directs the packet along the preferred route. The packet routing process receives (at the first spoke) the redirect message from the hub. The packet routing process creates, at the first spoke, a second request containing a destination address of the second spoke (that is intended to receive the packet). The packet routing process transmits the second request throughout a network, along the preferred route. The packet routing process receives (at the first spoke) receives notification from the second spoke that the second spoke is initiating a connection between the second spoke and the first spoke, and then receives a reply from the second spoke. The reply is associated with the packet transmitted from the first spoke to the second spoke.

Figure 1:
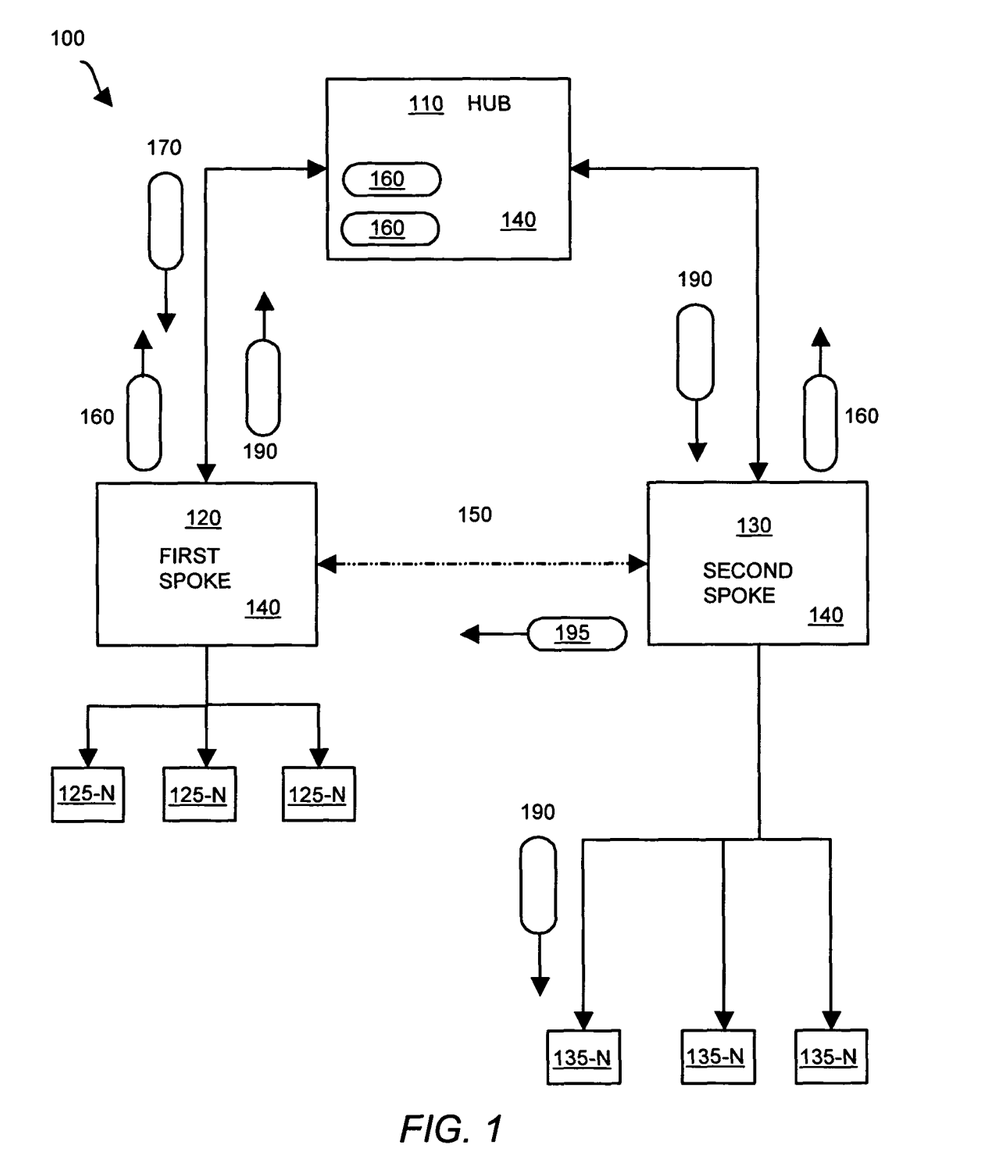
FIG. 1 shows a high level view of a network wherein a packet routing process routes packets, according to one embodiment disclosed herein.

FIG. 1 illustrates an example computer-networking environment 100 suitable for use in explaining example embodiments disclosed herein. A hub 110 connects to a first spoke 120 and a second spoke 130. The packet routing process 140 resides on the hub 110, the first spoke 120, and the second spoke 130. Both the first spoke 120 and the second spoke 130 transmit information 160 related to the networks 125-N and 135-N respectively associated with the first spoke 120 and the second spoke 130. The hub 110 stores the information 160 related to the networks respectively associated with the first spoke 120 and the second spoke 130. The first spoke 120 transmits a packet 190 to the hub 110. In response, the hub 110 transmits a redirect message 170 to the first spoke 120, directing the first spoke 120 to transmit the packet 190 directly to the second spoke 130 along a preferred route 150. In response to receiving the packet 190, the second spoke 130 transmits a reply 195 to the first spoke 120.

The packet routing process 140 may be embodied as software code such as data and/or logic instructions (e.g., code stored in the memory or on another computer readable medium such as a removable disk) that supports processing functionality according to different embodiments described herein.

It is noted that example configurations disclosed herein include the online packet routing process 140 itself (i.e., in the form of un-executed or non-performing logic instructions and/or data). The packet routing process 140 may be stored as an application on a computer readable medium (such as a floppy disk), hard disk, electronic, magnetic, optical, or other computer readable medium. The packet routing process 140 may also be stored in a memory system such as in firmware, read only memory (ROM), or, as in this example, as executable code in, for example, Random Access Memory (RAM). Those skilled in the art will understand that the hub 110, first spoke 120 and second spoke 130 may include other processes and/or software and hardware components, such as an operating system not shown in this example.

Further details of configurations explained herein will now be provided with respect to a flow chart of processing steps that show the high level operations disclosed herein.

Figure 2:
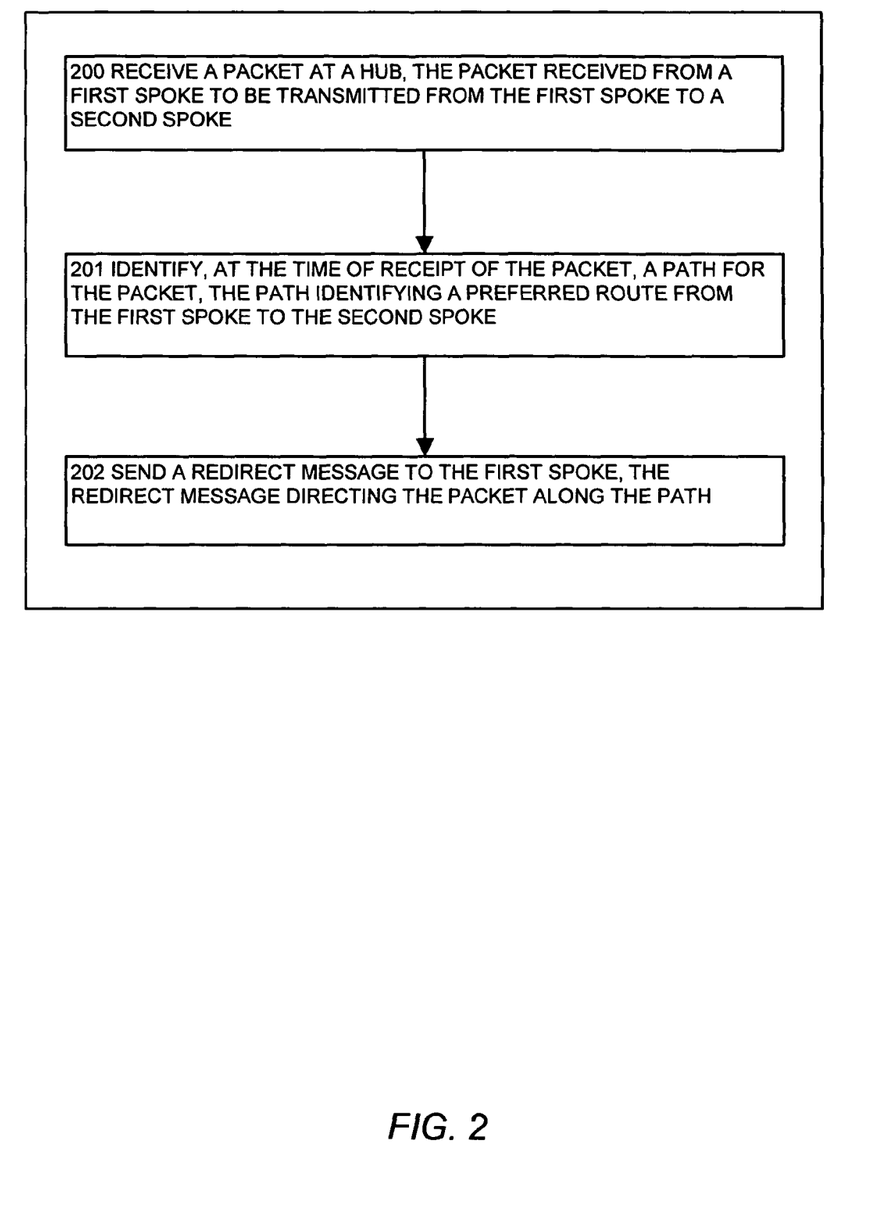
FIG. 2 illustrates a flowchart of a procedure performed by the system of FIG. 1 when the packet routing process receives a packet at a hub, the packet received from a first spoke regarding a packet to be transmitted from the first spoke to a second spoke, according to one embodiment disclosed herein.

FIG. 2 is a flowchart of the steps performed by the packet routing process 140, residing on the hub 110, when it receives a packet 190 from a first spoke 120 to be transmitted from the first spoke 120 to a second spoke 130.

In step 200, the packet routing process 140 receives a packet 190, at a hub 110. The packet 190, received from a first spoke 120, to be transmitted from the first spoke 120 to a second spoke 130. In an example configuration, the first spoke 120 has a packet 190 to be sent to second spoke 130. The hub 110 maintains information 160 regarding inter-spoke traffic, and can identify the best path for the packet 190 to travel from the first spoke 120 to the second spoke 130.

In step 201, the packet routing process 140, residing on the hub 110, identifies, at the time of receipt of the packet 190, a path for the packet 190. The path identifies a preferred route 150 from the first spoke 120 to the second spoke 130. In an example configuration, the hub 110 identifies a preferred route 150, i.e., the shortest path between the first spoke 120 and the second spoke 130. Without the preferred route 150, identified by the hub 110, the first spoke 120 would transmit the packet 190 to the second spoke 130 by traversing through the hub 110 (and possibly additional hubs between the first spoke 120 and the second spoke 130). This path is not necessarily the best path (i.e., most efficient) between the first spoke 120 and the second spoke 130.

In step 202, the packet routing process 140, residing on the hub 110, sends a redirect message 170 to the first spoke 120. The redirect message 170 directs the packet 190 along the path (i.e., the preferred route 150). In an example embodiment, the first spoke 120 has a packet 190 to be sent to second spoke 130. The first spoke 120 sends a packet 190 to the hub 110, and in response, receives a redirect message 170, from the hub 110. The redirect message 170 contains a preferred path 150 between the first spoke 120 and the second spoke 130.

Figure 3:
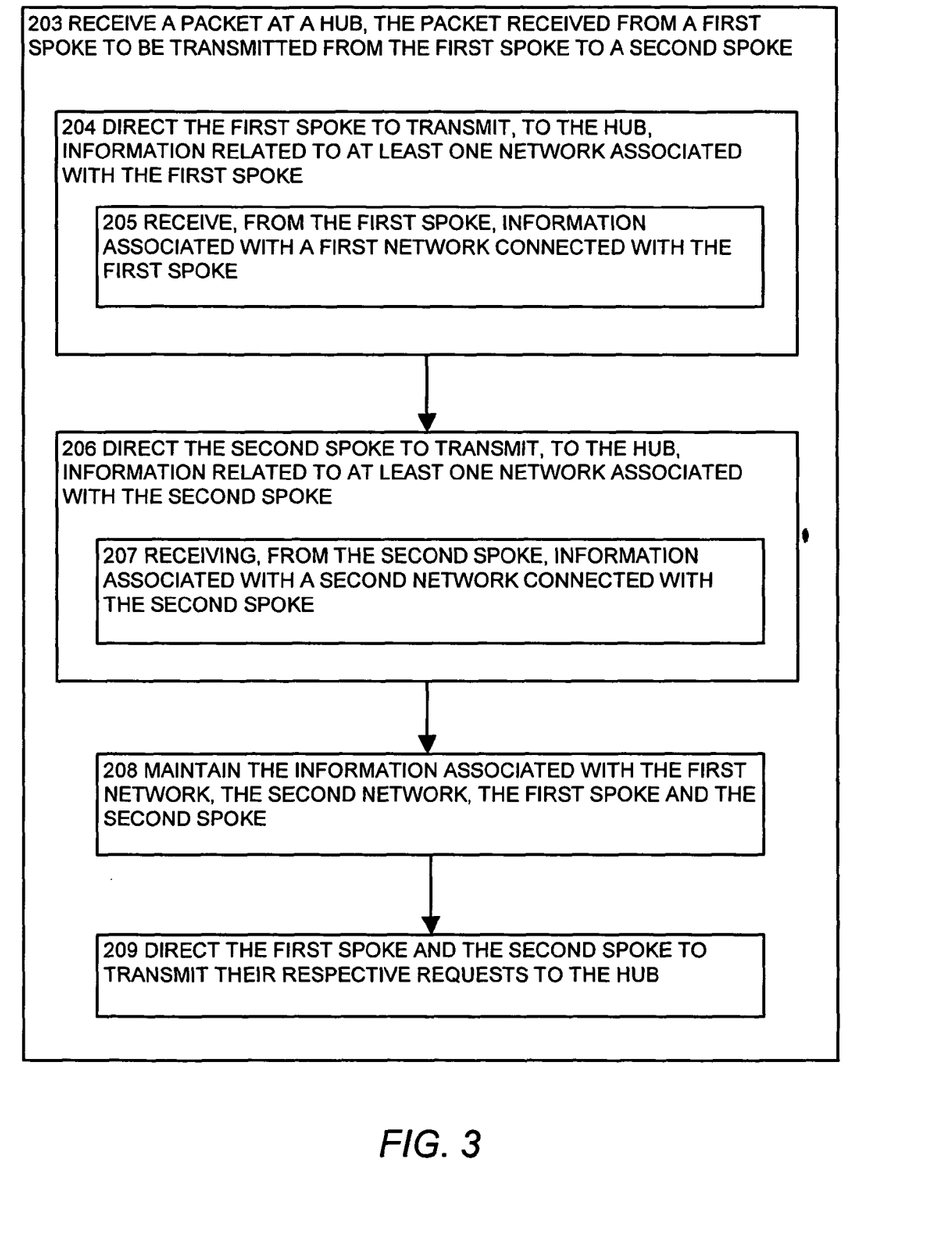
FIG. 3 illustrates a flowchart of a procedure performed by the system of FIG. 1 when the packet routing process receives a packet at a hub, and directs a first spoke and a second spoke to transmit to the hub, information related to networks associated with the first spoke and the second spoke, according to one embodiment disclosed herein.

FIG. 3 is a flowchart of the steps performed by the packet routing process 140, residing on the hub 110, when it receives a packet 190 from a first spoke 120 regarding a packet 190 to be transmitted from the first spoke 120 to a second spoke 130.

In step 203, the packet routing process 140, residing on the hub 110, receives a packet 190, at a hub 110. The packet 190, received from a first spoke 120, is to be transmitted from the first spoke 120 to a second spoke 130. In an example configuration, the first spoke 120 has a packet 190 to be sent to second spoke 130. The hub 110 maintains information 160 regarding inter-spoke traffic, and can identify the best path for the packet 190 to travel from the first spoke 120 to the second spoke 130.

In step 204, the packet routing process 140, residing on the hub 110, directs the first spoke 120 to transmit, to the hub 110, information 160 related to at least one network 125-1 associated with the first spoke 120. In an example configuration, the first spoke 120 is in communication with a plurality of networks 125-N. The hub 110 requests the first spoke 120 to transmit, to the hub 110, the information 160 regarding the plurality of networks 125-N with which the first spoke 120 communicates.

In step 205, the packet routing process 140, residing on the hub 110, receives, from the first spoke 120, information associated with a first network 125-1 connected with the first spoke 120. In an example configuration, the hub 110 requests the first spoke 120 to transmit, to the hub 110, the information 160 regarding the plurality of networks 125-N with which the first spoke 120 communicates. In response to the request from the hub 110, the first spoke 120 transmits, to the hub 110, information 160 related to at least one network 125-1 with which the first spoke 120 communicates.

In step 206, the packet routing process 140, residing on the hub 110, directs the second spoke 130 to transmit, to the hub 110, information 160 related to at least one network 125-1 associated with the second spoke 130. In an example configuration, the second spoke 130 is in communication with a plurality of networks 135-N. The hub 110 requests the second spoke 130 to transmit, to the hub 110, the information 160 regarding the plurality of networks 135-N with which the second spoke 130 communicates.

In step 207, the packet routing process 140, residing on the hub 110, receives, from the second spoke 130, information associated with a second network 135-2 connected with the second spoke 130. In an example configuration, the hub 110 requests the second spoke 130 to transmit, to the hub 110, the information 160 regarding the plurality of networks 135-N with which the second spoke 130 communicates. In response to the request from the hub 110, the second spoke 130 transmits, to the hub 110, information 160 related to at least one network 135-2 with which the second spoke 130 communicates.

In step 208, the packet routing process 140, residing on the hub 110, maintains the information 160 associated with the first network 125-1, the second network 135-2, the first spoke 120 and the second spoke 130. In an example configuration, the hub 110 directs both the first spoke 120 and the second spoke 130 to transmit, to the hub 110, information 160 related to networks 125-N and 135-N with which the first spoke 120 and second spoke 130 respectively communicate.

In step 209, the packet routing process 140, residing on the hub 110, directs the first spoke 120 and the second spoke 130 to transmit their respective packets 190 to the hub 110. In an example configuration, the hub 110 directs both the first spoke 120 and the second spoke 130 to transmit, to the hub 110, information 160 related to networks 125-N and 135-N with which the first spoke 120 and second spoke 130 respectively communicate. With this information 160, the hub 110 is able to determine the best path (i.e., preferred route 150) for inter spoke traffic. Thus, the hub 110 directs the first spoke 120 and the second spoke 130 transmit any inter spoke traffic packets 190 to the hub. In return, the packet routing process 140, residing on the hub 110, determines the preferred route 150 for the packet 190.

Figure 4:
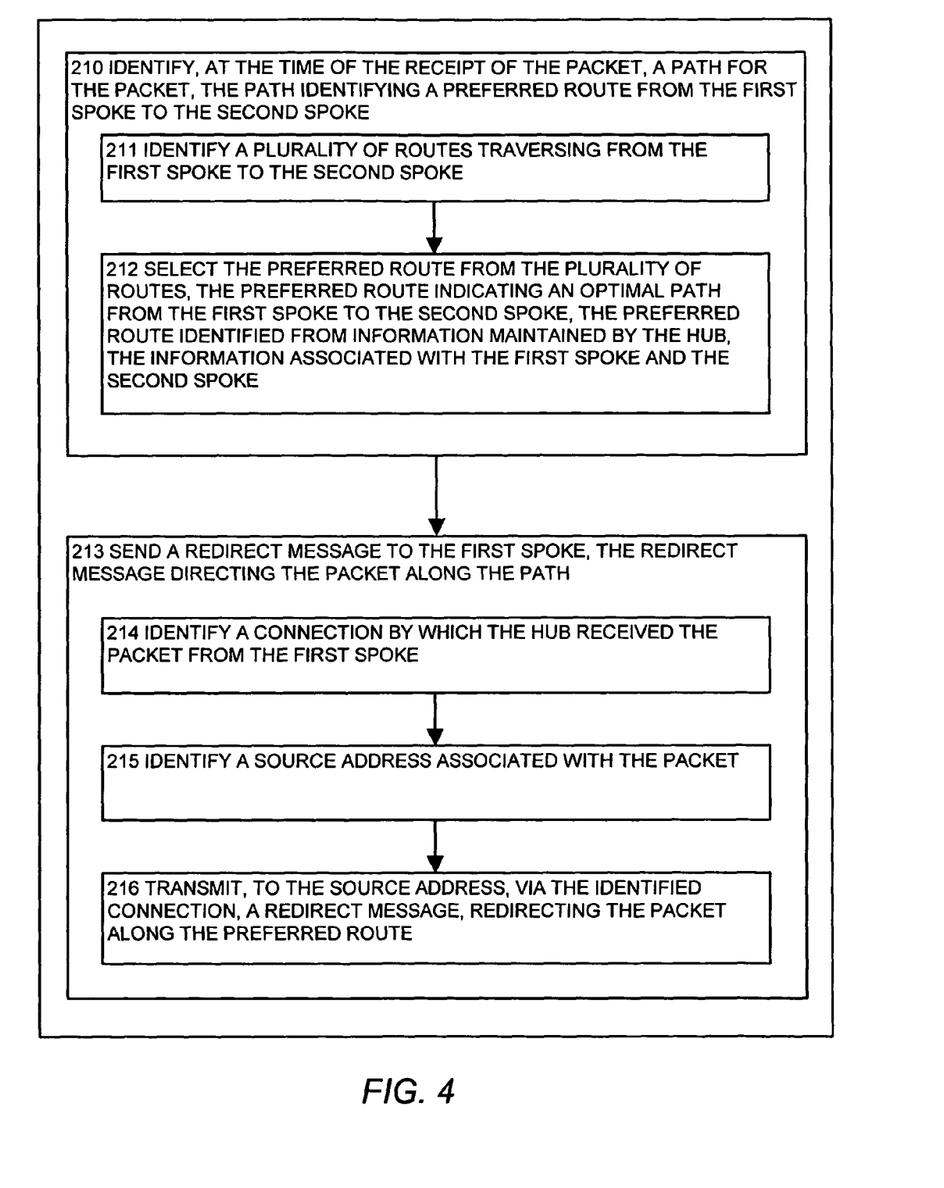
FIG. 4 illustrates a flowchart of a procedure performed by the system of FIG. 1 when the packet routing process identifies, at the time of receipt of the packet, a path for the packet, the path identifying a preferred route from the first spoke to the second spoke, according to one embodiment disclosed herein.

FIG. 4 is a flowchart of the steps performed by the packet routing process 140, residing on the hub 110, when it identifies, at the time of receipt of the packet 190, a path for the packet 190. The path identifies a preferred route 150 from the first spoke 120 to the second spoke 130.

In step 210, the packet routing process 140, residing on the hub 110, identifies, at the time of receipt of the packet 190, a path for the packet 190. The path identifies a preferred route 150 from the first spoke 120 to the second spoke 130. In an example configuration, the hub 110 identifies a preferred route 150, i.e., the shortest path between the first spoke 120 and the second spoke 130. Without the preferred route 150, identified by the hub 110, the first spoke 120 would transmit the packet 190 to the second spoke 130 by traversing through the hub 110 (and possibly additional hubs between the first spoke 120 and the second spoke 130). This path is not necessarily the best path between the first spoke 120 and the second spoke 130.

In step 211, the packet routing process 140, residing on the hub 110, identifies a plurality of routes traversing from the first spoke 120 to the second spoke 130. In an example configuration, the hub 110 directs both the first spoke 120 and the second spoke 130 to transmit, to the hub 110, information 160 related to networks 125-N and 135-N with which the first spoke 120 and second spoke 130 respectively communicate. With this information 160, the hub 110 identifies a plurality of routes traversing from the first spoke 120 to the second spoke 130.

In step 212, the packet routing process 140, residing on the hub 110, selects the preferred route 150 from the plurality of routes. The preferred route 150 indicates an optimal path (i.e., a preferred route 150) from the first spoke 120 to the second spoke 130. The preferred route 150 is identified from information 160 maintained by the hub 110. The information 160 is associated with the first spoke 120 and the second spoke 130. In an example configuration, the hub 110 directs both the first spoke 120 and the second spoke 130 to transmit, to the hub 110, information 160 related to networks 125-N and 135-N with which the first spoke 120 and second spoke 130 respectively communicate. With this information 160, the hub 110 identifies a plurality of routes traversing from the first spoke 120 to the second spoke 130, and selects the preferred route 150 (indicating the best path from the first spoke 120 to the second spoke 130) from the plurality of routes.

In step 213, the packet routing process 140, residing on the hub 110, sends a redirect message 170 to the first spoke 120. The redirect message 170 directs the packet 190 along the path identified by the hub 110 as the preferred route 150 between the first spoke 120 and the second spoke 130. In an example embodiment, the first spoke 120 has a packet 190 to be sent to second spoke 130. The first spoke 120 sends a packet 190 to the hub 110, and in response, receives a redirect message 170, from the hub 110. The redirect message 170 contains a preferred path 150 between the first spoke 120 and the second spoke 130.

In step 214, the packet routing process 140, residing on the hub 110, identifies a connection by which the hub 110 received the packet 190 from the first spoke 120. In an example configuration, the first spoke 120 creates a tunnel between the first spoke 120 and the hub 110, and through this tunnel, sends the packet 190 to the hub 110.

In step 215, the packet routing process 140, residing on the hub 110, identifies a source address associated with the packet 190. In an example configuration, the first spoke 120 creates a tunnel between the first spoke 120 and the hub 110, and through this tunnel, sends the packet 190 to the hub 110. The packet 190 is to be sent from the first spoke 120 to the second spoke 130. The packet routing process 140 identifies a source address (i.e., the IP address of the first spoke 120) in the packet 190, and identifies the packet 190 as having been sent from the first spoke 120.

In step 216, the packet routing process 140, residing on the hub 110, transmits, to the source address, via the identified connection, a redirect message 170, redirecting the packet 190 along the preferred route 150. In an example configuration, the packet routing process 140, residing on the hub 110, identifies a preferred route 150 from the first spoke 120 to the second spoke 130. The packet routing process 140 transmits, to the source address identified in the packet 190, a redirect message 170 (redirecting the first spoke 120 to transmit the packet 190 to the second spoke 120 via the preferred route 150).

Figure 5:
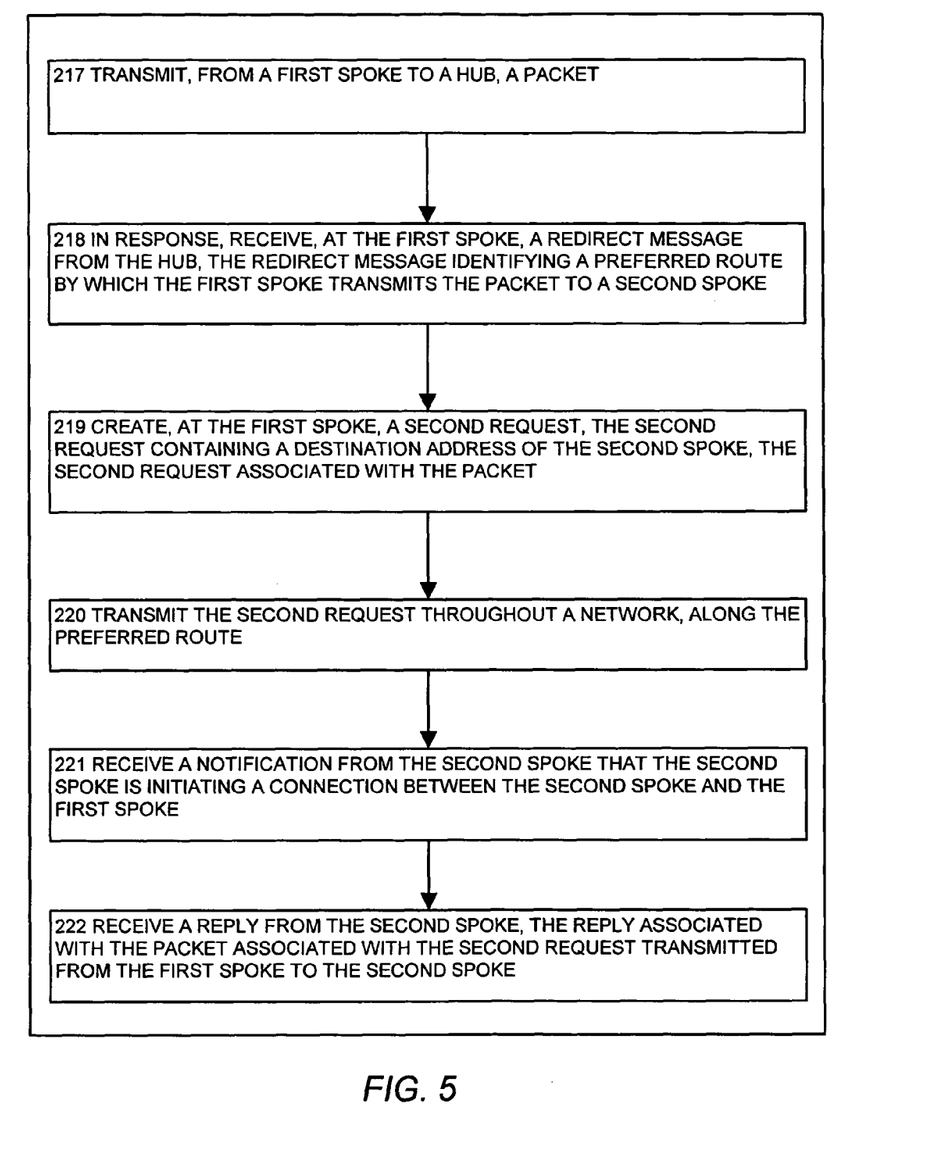
FIG. 5 illustrates a flowchart of a procedure performed by the system of FIG. 1 when the packet routing process transmits, from a first spoke to a hub, a packet, according to one embodiment disclosed herein.

FIG. 5 is a flowchart of the steps performed by the packet routing process 140, residing on the first spoke 120, when it transmits, from a first spoke 120 to the hub 110, a packet 190.

In step 217, the packet routing process 140, residing on the first spoke 120, transmits, from a first spoke 120 to the hub 110, a packet 190. In an example configuration, the first spoke 120 has a packet 190 to be sent to second spoke 130. The hub 110 maintains information 160 regarding inter-spoke traffic, and can identify the best path for the packet 190 to travel from the first spoke 120 to the second spoke 130. Thus, the packet routing process 140, residing on the first spoke 120, transmits the packet 190 from the first spoke 120 to the hub 110.

In step 218, the packet routing process 140, residing on the first spoke 120, in response, receives, at the first spoke 120, a redirect message 170 from the hub 110. The redirect message 170 identifies a preferred route 150 by which the first spoke 120 transmits the packet 190 to the second spoke 130. In an example embodiment, the first spoke 120 has a packet 190 to be sent to second spoke 130. The first spoke 120 sends a packet 190 to the hub 110, and in response, receives a redirect message 170, from the hub 110. The redirect message 170 contains a preferred path 150 between the first spoke 120 and the second spoke 130.

In step 219, the packet routing process 140, residing on the first spoke 120, creates, at the first spoke 120, a packet 190, the packet 190 containing a destination address of the second spoke 130. In an example configuration, the first spoke 120 sends a packet 190 to the hub 110, and in response, receives a redirect message 170, from the hub 110. The redirect message 170 contains a preferred path 150 between the first spoke 120 and the second spoke 130. Using information contained within the redirect message 170, the packet routing process 140, residing on the first spoke 120, creates a packet 190 containing a destination address of the second spoke 130.

In step 220, the packet routing process 140, residing on the first spoke 120, transmits the packet 190 throughout the network 100, along the preferred route 150. In an example configuration, the first spoke 120 transmits the packet 190 along the preferred route 150 via a series of hops. The second spoke 130 receives the packet 190. The second spoke 130 determines that the second spoke 130 is the best spoke to deliver the packet to the destination IP address contained within the packet 190.

In step 221, the packet routing process 140, residing on the first spoke 120, receives a notification from the second spoke 130 that the second spoke 130 is initiating a connection between the second spoke 130 and the first spoke 120. In an example configuration, the second spoke 130 receives the packet 190, determines that the second spoke 130 is the best spoke to deliver the packet to the destination IP address contained within the packet 190, and creates a tunnel between the second spoke 130 and the first spoke 120.

In step 222, the packet routing process 140, residing on the first spoke 120, receives a reply 195 from the second spoke 130. The reply 195 is associated with the packet 190 transmitted from the first spoke 120 to the second spoke 130. In an example configuration, the first spoke 120 transmits a packet 190 to the second spoke 130, along a preferred route 150 identified by the hub 110. In response, the second spoke 130 determines it (i.e., the second spoke 130) is the best spoke to deliver the packet 190 to the destination IP address of that packet 190, creates a tunnel with the first spoke 120, and transmits a reply 195 (in response to the transmitted packet 190) to the first spoke 120.

Figure 6:
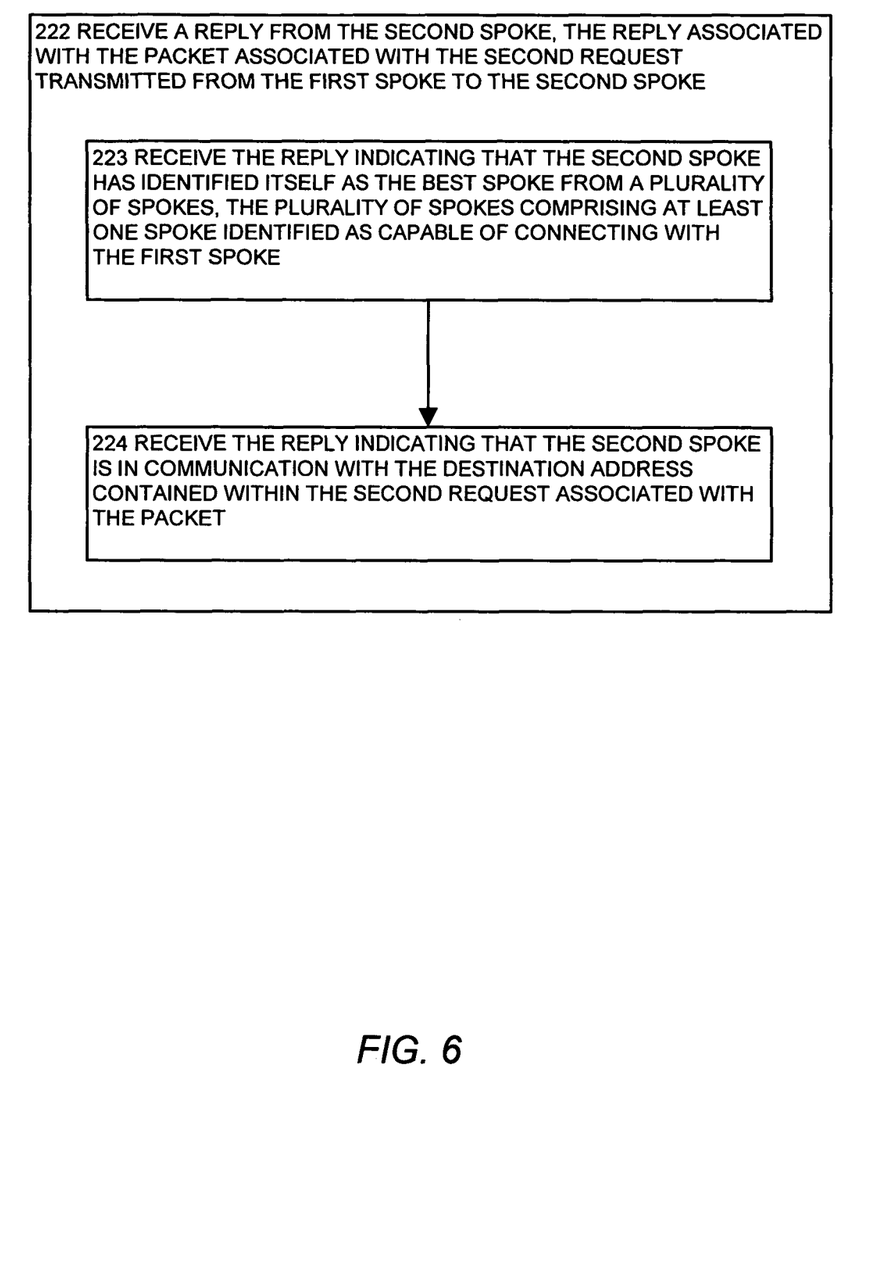
FIG. 6 illustrates a flowchart of a procedure performed by the system of FIG. 1 when the packet routing process receives a reply from the second spoke, the reply associated with the packet associated with the second request transmitted from the first spoke to the second spoke, according to one embodiment disclosed herein.

FIG. 6 is a flowchart of the steps performed by the packet routing process 140, residing on the first spoke 120, when it receives the reply 195 indicating that the second spoke 130 has identified itself as the best spoke from a plurality of spokes.

In step 223, the packet routing process 140, residing on the first spoke 120, receives a reply 195 from the second spoke 130. The reply 195 is associated with the packet 190 transmitted from the first spoke 120 to the second spoke 130. In an example configuration, the first spoke 120 transmits a packet 190 to the second spoke 130, along a preferred route 150 identified by the hub 110. In response, the second spoke 130 determines it (i.e., the second spoke 130) is the best spoke to deliver the packet 190 to the destination IP address of that packet 190, creates a tunnel with the first spoke 120, and transmits a reply 195 (in response to the transmitted packet 190) to the first spoke 120.

In step 224, the packet routing process 140, residing on the first spoke 120, receives the reply 195 indicating that the second spoke 130 is in communication with the destination address contained within the packet 190. In an example configuration, the second spoke 130 determines that it (i.e., the second spoke 130) is the best spoke to deliver the packet 190 to the destination (of the packet 190). While other spokes may also be in communication with the destination address contained within packet 190, the second spoke 130 has determined that it (i.e., the second spoke 130) is the best spoke to deliver the packet 190.

In an example configuration, the computer-networking environment 100 comprises a system containing a hub 110, and a first spoke 120. The hub 110 is configured to perform the operations of receiving a request 160 at a hub 110, identifying a preferred route 150 for the packet 190 (associated with the request 160), and sending a redirect message 170 to the first spoke 120. The redirect message 170 directs the packet 190 toward a second spoke 130 along the preferred route 150. The request 160 received at the hub 110 is received from a first spoke 120. The request 160 is associated with a packet 190 to be transmitted from the first spoke 120 to the second spoke 130. The preferred route 150 identifies (at the time the request 160 is received at the hub 110), the best path from the first spoke 120 to the second spoke 130.

The first spoke 120 is configured to perform the operations of transmitting a first request 160 to the hub 110, receiving the redirect message 170 from the hub 110, creating a second request 160, and transmitting the second request 160 to the second spoke 130. The first request 160, transmitted from the first spoke 120 to the hub 110, is associated with a packet 190 to be transmitted from the first spoke 120 to the second spoke 130. In response to transmitting the first request 160 to the hub 110, the first spoke 120 receives a redirect message 170 from the hub 110. The redirect message 170 identifies the preferred route 150 from the first spoke 120 to the second spoke 130. The first spoke 120 creates a second request 160 (associated with the packet 190) containing the destination address of the second spoke 130, and transmits the second request 160 throughout the network, along the preferred route 150 towards the second spoke 130.

In another embodiment, the hub 110 sends, to the first spoke 120 and the second spoke 130, information 160 that is a collection or a summary of the information 160 that the hub received from the first spoke 120 and the second spoke 130. The information 160 is used by the first spoke 120 and the second spoke 130 to know what destination networks (or summaries of networks, for example networks 125-N and 135-N) are currently available. The information 160 directs the first spoke 120 and the second spoke 130 to send packets 190 to the hub 110 to reach these networks (i.e., networks 125-N and 135-N). The first spoke 120 transmits a packet 190 along the current known path to the hub 110. The hub 110 forwards this packet 190 on to spoke 130. Also, the hub 110 detects that this packet 190 is not taking the optimal path, since the hub 110 is an intermediate hop on the current path. The hub 110 creates and transmits a redirect message 170 to the first spoke 120, directing the first spoke 120 to create a resolution request packet (not shown) for the destination network 135-N of the packet 190, and transmits the resolution request packet, along the current known path to network 135-N via the hub 110. The hub 110 forwards the resolution request packet to the second spoke, 130, along the current known path to network 135-N. The second spoke 130 receives the resolution request packet. The second spoke 130 determines that the second spoke 130 is the end point of the optimal path, and using information from the resolution request packet initiates a VPN tunnel 150, back to the first spoke 120. After the VPN tunnel 150 is established, the second spoke 130 sends a resolution reply 195 directly back to the first spoke 120. Further packets, 190, between the networks 125-N, behind the first spoke 120 and the networks 135-N behind the second spoke 130, will traverse the direct VPN tunnel 150 between the first spoke 120 and the second spoke 130.

The packet routing process 140 receives a packet 190, at a hub 110. The packet 190, received from a first spoke 120, is to be transmitted from the first spoke 120 to a second spoke 130. In an example configuration, the first spoke 120 has a packet 190 to be sent to a network 135-1 located behind the second spoke 130. The hub 110 maintains information 160 regarding inter-spoke traffic routing, and can forward the packet 190 along a path from the first spoke 120 to the network 135-1 located behind the second spoke 130. The packet routing process 140, residing on the hub 110, identifies, at the time of receipt and forwarding of the packet 190, that the current path is not the optimal path between the first spoke 120 and the second spoke 130. The hub 110 is able to make this determination because the hub 110 itself is an additional hop along the path, and there may be additional hops before the packet 190 reaches the second spoke 130. The hub 110 continues to forward the packet 190 along this non-optimal path. While the optimal path is being found and built, the first spoke 120 transmits the packet 190 to the second spoke 130 by traversing through the hub 110 (and possibly additional hubs between the first spoke 120 and the second spoke 130). This path is not necessarily the best path (i.e., most efficient) between the first spoke 120 and the second spoke 130.

The packet routing process 140, residing on the hub 110, sends a redirect message 170 to the first spoke 120. The redirect message 170 directs the first spoke 120 to create and send a resolution request packet to find the optimal path (direct VPN tunnel 150) between the first spoke 120 and the second spoke 130 behind which is the destination network 135-N of the packet 190. In a DMVPN network, the spokes are configured with information that enables them to build a VPN tunnel 150 to the hub 110. The spokes perform these tasks, and then the spokes send information 160 to the hub 110 about which networks each spoke is "servicing". This routing information is used by the hub 110 to forward data packets between the spokes, and also to forward resolution request packets between the spokes. This defines a path between the spokes, but it is not the optimal path. The optimal path between the spokes would be a direct tunnel 150 between the first spoke 120 and the second spoke 130, but to find the optimal path the spokes must be able to send packets to each other through the non-optimal path.

In an example embodiment, the first spoke 120 builds a VPN tunnel 150 to the hub 110 using pre-configured information 160. The first spoke 120 supplies information 160 for the hub 110 to able to forward packets to the first spoke 120 via the VPN tunnel 150. The first spoke 120 sends information 160 to the hub 110 about the networks 135-N that the first spoke 120 is "servicing". The hub 110 sends this information 160 (or a summary of this information 160) to all other connected spokes, for example, the second spoke 130. The hub 110 sends information 160 (or a summary of this information 160) from all of the other spokes (such as the second spoke 130) to the first spoke 120. These steps are repeated for each spoke that attaches to the hub 110. This advertises which networks are available, and sets up the non-optimal path (routed path) via the hub 110. A spoke cannot forward data packets to destinations that the spoke doesn't know about (or at least know about a summary of that route). For example, the first spoke 120 has a packet 190 to forward to a destination network. 135-N. The first spoke 120 sends the packet 190 to the hub 110 using information 160 about which networks are currently reachable to the first spoke 120. The first spoke 120 received the information 160 from the hub 110. The hub 110 receives the packet 190, and forwards the packet 190 to the second spoke 130, using the information 160 that the hub 110 received from the second spoke 130. The hub 110 identifies that the packet 190 didn't take the optimal path, since the hub 110 was an intermediate hop along the current path. The hub 110 sends a redirect message 170 to the first spoke 120 to tell the first spoke 120 to find the optimal path to the destination network 135-N. The redirect message 170, sent from the hub 110, is sent to the previous VPN tunnel hop (i.e., the first spoke 120) and not to the source address on the data packet (the host behind the first spoke 120 that originated the data packet). The redirect message 170 doesn't supply the optimal path, thus, the hub 110 cannot actually know the optimal path. The redirect message 170 simply instructs the first spoke 120 to create and send a resolution packet to find the optimal path.

The redirect packet 170 contains source information associated with the first spoke 120; such that the remote end of the optimal path (i.e., the second spoke 130) can build a VPN tunnel back 150 to the first spoke 120. The resolution message also contains the destination address from the packet 190 that triggered the redirect message 170, and subsequently the resolution message. This destination address is used to forward the resolution message through the network (via the hub 110) to find the second spoke 130, the remote end of the optimal path.

The packet routing process 140 transmits the resolution request through the network along the known non-optimal path to reach the second spoke 130, the remote end of the optimal path. The resolution reply informs the first spoke 120 about the destination network 135-N (behind the second spoke 130) for which it is to use the VPN tunnel 130 created between the first spoke 120 and the second spoke 130. This is the optimal path for the first spoke 120 to use to send packets destined to the network 135-N.

The first spoke 120 forwards packets destined to hosts within the network 135-N directly to the second spoke 130 (i.e., the optimal path). Other destinations will still be forwarded via the hub 110, or via other direct paths (optimal paths) that have been previously setup.

While computer systems and methods have been particularly shown and described above with references to configurations thereof, it will be understood by those skilled in the art that various changes in form and details may be made therein without departing from the scope disclosed herein. Accordingly, embodiments disclosed herein are not intended to be limited by the example configurations provided above.

What is claimed is:

1. A method of routing packets, the method comprising:
receiving a packet at a hub, the packet received from a first spoke to be transmitted from the first spoke to a second spoke;
in response to receipt of the packet at the hub, directing the second spoke to transmit, to the hub, information about a plurality of networks with which the second spoke communicates;
based on the information transmitted by the second spoke about the plurality of networks with which the second spoke communicates, identifying a path for the packet, the path identifying a preferred route that bypasses the hub from the first spoke to the second spoke;
sending a redirect message to the first spoke, the redirect message directing the packet along the path;
wherein identifying a path comprises:
identifying a plurality of routes traversing from the first spoke to the second spoke;
selecting the preferred route from the plurality of routes, the preferred route indicating an optimal path from the first spoke to the second spoke, the preferred route identified from information maintained by the hub, the information associated with the first spoke and the second spoke;
wherein sending the redirect message comprises:
identifying a connection by which the hub received the packet from the first spoke;
identifying a source address associated with the packet;
transmitting, to the source address, via the identified connection, the redirect message, redirecting the packet along the preferred route:
wherein the method is performed by one or more computing devices.

2. The method of claim 1 wherein receiving a packet at a hub, the packet received from a first spoke to be transmitted from the first spoke to a second spoke comprises:
directing the first spoke to transmit, to the hub, information related to at least one network associated with the first spoke.

3. The method of claim 2 wherein directing the first spoke to transmit, to the hub, information related to at least one network associated with the first spoke comprises:
receiving, from the first spoke, information associated with a first network connected with the first spoke.

4. The method of claim 3 comprising:
maintaining the information associated with the first network, the second network, the first spoke and the second spoke; and
directing the first spoke and the second spoke to transmit their respective packets to the hub.

5. A system for routing packets, the system comprising:
in a hub configured to perform the operations of:
receiving a packet at the hub, the packet received from a first spoke to be transmitted from the first spoke to a second spoke;
in response to receipt of the packet at the hub, directing the second spoke to transmit, to the hub, information about a plurality of networks with which the second spoke communicates;
based on the information transmitted by the second spoke about the plurality of networks with which the second spoke communicates, identifying, in response to receipt of the packet at the hub, a path for the packet, the path identifying a preferred route that bypasses the hub from the first spoke to the second spoke;
sending a redirect message to the first spoke, the redirect message directing the packet along the path;
wherein identifying a path comprises:
identifying a plurality of routes traversing from the first spoke to the second spoke;
selecting the preferred route from the plurality of routes, the preferred route indicating an optimal path from the first spoke to the second spoke, the preferred route identified from information maintained by the hub, the information associated with the first spoke and the second spoke;
wherein sending the redirect message comprises:
identifying a connection by which the hub received the packet from the first spoke;
identifying a source address associated with the packet;
transmitting, to the source address, via the identified connection, the redirect message, redirecting the packet along the preferred route:
in the first spoke configured to perform the operation of:
transmitting, from a first spoke to a hub, a packet;
in response, receiving, at the first spoke, a redirect message from the hub, the redirect message identifying a preferred route, bypassing the hub, by which the first spoke transmits the packet to a second spoke;
creating, at the first spoke, a second request, the second request containing a destination address of the second spoke, the second request associated with the packet; and
transmitting the second request throughout a network, along the preferred route.

6. A computerized device comprising:
a memory;
a processor;
a communications interface;
an interconnection mechanism coupling the memory, the processor and the communications interface;
wherein the memory is encoded with a packet routing application that when executed on the processor routes packets on the computerized device by performing operations comprising:
receiving a packet at a hub, the packet received from a first spoke to be transmitted from the first spoke to a second spoke;
in response to receipt of the packet at the hub, directing the second spoke to transmit, to the hub, information about a plurality of networks with which the second spoke communicates;
based on the information transmitted by the second spoke about the plurality of networks with which the second spoke communicates, identifying a path for the packet, the path identifying a preferred route that bypasses the hub from the first spoke to the second spoke;
sending a redirect message to the first spoke, the redirect message directing the packet along the path;
wherein identifying a path comprises:
identifying a plurality of routes traversing from the first spoke to the second spoke;
selecting the preferred route from the plurality of routes, the preferred route indicating an optimal path from the first spoke to the second spoke, the preferred route identified from information maintained by the hub, the information associated with the first spoke and the second spoke;
wherein sending the redirect message comprises:
identifying a connection by which the hub received the packet from the first spoke;
identifying a source address associated with the packet;
transmitting, to the source address, via the identified connection, the redirect message, redirecting the packet along the preferred route.

7. The computerized device of claim 6 wherein when the computerized device performs the operation of receiving a packet at a hub, the packet received from a first spoke to be transmitted from the first spoke to a second spoke, the computerized device performs operations comprising:
directing the first spoke to transmit, to the hub, information related to at least one network associated with the first spoke.

8. The computerized device of claim 7 wherein when the computerized device performs the operation of directing the first spoke to transmit, to the hub, information related to at least one network associated with the first spoke, the computerized device performs operations comprising:
receiving, from the first spoke, information associated with a first network connected with the first spoke.

9. The computerized device of claim 8 wherein the computerized device performs operations comprising:
maintaining the information associated with the first network, the second network, the first spoke and the second spoke; and
directing the first spoke and the second spoke to transmit their respective requests to the hub.

10. The method of claim 1, wherein a tunnel is created along the path.

11. The method of claim 1, wherein the first spoke and the second spoke are multiple hops from each other.

12. A non-transitory computer-readable medium carrying one or more sequences of instructions which, when executed by one or more processors, cause the one or more processors to carry out the steps of:
receiving a packet at a hub, the packet received from a first spoke to be transmitted from the first spoke to a second spoke;
in response to receipt of the packet at the hub, directing the second spoke to transmit, to the hub, information about a plurality of networks with which the second spoke communicates;
based on the information transmitted by the second spoke about the plurality of networks with which the second spoke communicates, identifying a path for the packet, the path identifying a preferred route that bypasses the hub from the first spoke to the second spoke;
sending a redirect message to the first spoke, the redirect message directing the packet along the path;
wherein identifying a path comprises:
identifying a plurality of routes traversing from the first spoke to the second spoke;
selecting the preferred route from the plurality of routes, the preferred route indicating an optimal path from the first spoke to the second spoke, the preferred route identified from information maintained by the hub, the information associated with the first spoke and the second spoke;
wherein sending the redirect message comprises:
identifying a connection by which the hub received the packet from the first spoke;
identifying a source address associated with the packet;
transmitting, to the source address, via the identified connection, the redirect message, redirecting the packet along the preferred route.

13. The non-transitory computer-readable medium of claim 12 wherein receiving a packet at a hub, the packet received from a first spoke to be transmitted from the first spoke to a second spoke comprises:
directing the first spoke to transmit, to the hub, information related to at least one network associated with the first spoke.

14. The non-transitory computer-readable medium of claim 13 wherein directing the first spoke to transmit, to the hub, information related to at least one network associated with the first spoke comprises:

receiving, from the first spoke, information associated with a first network connected with the first spoke.

15. The non-transitory computer-readable medium of claim 14 further comprising instructions which, when executed by the one or more processors, cause the one or more processors to perform:
    maintaining the information associated with the first network, the second network, the first spoke and the second spoke; and
    directing the first spoke and the second spoke to transmit their respective packets to the hub.

16. The computerized device of claim 6, wherein a tunnel is created along the path.

17. The computerized device of claim 6, wherein the first spoke and the second spoke are multiple hops from each other.

18. The non-transitory computer-readable medium of claim 12, wherein a tunnel is created along the path.

19. The non-transitory computer-readable medium of claim 12, wherein the first spoke and the second spoke are multiple hops from each other.

* * * * *